(12) United States Patent
Dickie et al.

(10) Patent No.: US 10,235,376 B2
(45) Date of Patent: *Mar. 19, 2019

(54) MERGING METADATA FOR DATABASE STORAGE REGIONS BASED ON OVERLAPPING RANGE VALUES

(71) Applicant: International Business Machines Corporation, Armonk, NY (US)

(72) Inventors: Garth A. Dickie, Framingham, MA (US); Daniel J. Feldman, Brookline, MA (US); David L. Meyers, Shrewsbury, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/203,896

(22) Filed: Jul. 7, 2016

(65) Prior Publication Data
US 2016/0314168 A1    Oct. 27, 2016

Related U.S. Application Data

(63) Continuation of application No. 14/041,250, filed on Sep. 30, 2013, now Pat. No. 9,588,978.

(51) Int. Cl.
*G06F 7/00* (2006.01)
*G06F 17/30* (2006.01)
*G06F 17/24* (2006.01)

(52) U.S. Cl.
CPC .......... *G06F 17/3012* (2013.01); *G06F 17/24* (2013.01); *G06F 17/30312* (2013.01); *G06F 17/30386* (2013.01); *G06F 17/30442* (2013.01); *G06F 17/30595* (2013.01); *G06F 17/30607* (2013.01)

(58) Field of Classification Search
CPC ....................................................... G06F 17/24
See application file for complete search history.

(56) References Cited

U.S. PATENT DOCUMENTS

| 6,272,487 | B1 | 8/2001 | Beavin |
| 6,353,826 | B1 | 3/2002 | Seputis |
| 6,556,986 | B2 | 4/2003 | Hara |
| 6,973,452 | B2 | 12/2005 | Metzger et al. |

(Continued)

FOREIGN PATENT DOCUMENTS

WO    WO2009072233    6/2009

OTHER PUBLICATIONS

Graefe, Goetz; "Fast Loads and Fast Queries", Hewlett-Packard Laboratories, Data Warehouse and Knowledge Discovery Lecture Notes in Computer Science, vol. 5691, 2009, pp. 111-124.

(Continued)

*Primary Examiner* — Ajith Jacob
(74) *Attorney, Agent, or Firm* — Robert Bunker; Edell, Shapiro & Finnan, LLC

(57) ABSTRACT

Metadata for a plurality of database storage regions within memory are merged, where the metadata for each storage region comprises an interval including first and second interval values indicating a value range for values within that storage region. The first and second interval values are examined to identify overlapping storage regions and produce a sum of over-lapped storage regions. The sum of overlapped storage regions is compared to a threshold and the metadata of the overlapped storage regions are merged based on the comparison.

20 Claims, 2 Drawing Sheets

(56) References Cited

U.S. PATENT DOCUMENTS

| | | |
|---|---|---|
| 7,080,062 B1 | 7/2006 | Leung et al. |
| 7,152,060 B2 | 12/2006 | Borthwick et al. |
| 7,251,663 B1 | 7/2007 | Smith |
| 7,415,573 B2 | 8/2008 | Murayama et al. |
| 7,461,050 B2 | 12/2008 | Corvinelli et al. |
| 7,484,068 B2 | 1/2009 | Hu |
| 7,774,336 B2 | 8/2010 | Beyer et al. |
| 7,958,113 B2 | 6/2011 | Fan et al. |
| 8,108,400 B2 | 1/2012 | Graefe |
| 8,176,021 B2 | 5/2012 | Kodavalla et al. |
| 8,224,879 B2 | 7/2012 | Kuwahara |
| 8,234,295 B2 | 7/2012 | Haas et al. |
| 8,341,180 B1 | 12/2012 | Arumugam et al. |
| 8,380,714 B2 | 2/2013 | Inagaki |
| 8,572,068 B2 | 10/2013 | Graefe et al. |
| 8,768,916 B1 | 7/2014 | Ghazal |
| 8,879,550 B2 | 11/2014 | Anand et al. |
| 8,972,337 B1 | 3/2015 | Gupta |
| 9,372,889 B1 | 6/2016 | Jakobsson et al. |
| 9,514,187 B2 | 12/2016 | Ziauddin |
| 2004/0039891 A1 | 2/2004 | Leung et al. |
| 2005/0010564 A1 | 1/2005 | Metzger |
| 2005/0086257 A1 | 4/2005 | Wright |
| 2005/0187917 A1 | 8/2005 | Lawande et al. |
| 2007/0113007 A1 | 5/2007 | Murayama et al. |
| 2008/0177777 A1 | 7/2008 | Osaki |
| 2008/0215531 A1 | 9/2008 | Markl et al. |
| 2008/0263001 A1 | 10/2008 | Lohman et al. |
| 2009/0055352 A1 | 2/2009 | Corvinelli et al. |
| 2009/0070313 A1 | 3/2009 | Beyer et al. |
| 2009/0254522 A1 | 10/2009 | Chaudhuri |
| 2009/0299989 A1 | 12/2009 | Zhang et al. |
| 2010/0114870 A1 | 5/2010 | Al-Omari et al. |
| 2010/0332457 A1 | 12/2010 | Graefe |
| 2011/0029508 A1 | 2/2011 | Al-Omari |
| 2011/0137895 A1 | 6/2011 | Petrou |
| 2011/0307521 A1 | 12/2011 | Slezak et al. |
| 2012/0078904 A1 | 3/2012 | Agrawal et al. |
| 2012/0084287 A1 | 4/2012 | Lakshminarayan |
| 2013/0073537 A1 | 3/2013 | Simon et al. |
| 2013/0144815 A1 | 6/2013 | Luo et al. |
| 2013/0166557 A1 | 6/2013 | Fricke et al. |
| 2013/0185178 A1 | 7/2013 | Greef |
| 2013/0198163 A1 | 8/2013 | Slezak et al. |
| 2013/0254212 A1 | 9/2013 | Rao et al. |
| 2013/0297587 A1 | 11/2013 | Singh et al. |
| 2013/0301641 A1 | 11/2013 | Anand et al. |
| 2014/0095520 A1 | 4/2014 | Ziauddin et al. |
| 2015/0012544 A1 | 1/2015 | Nishimura |
| 2015/0019529 A1 | 1/2015 | Veldhuizen |
| 2015/0032684 A1 | 1/2015 | Gupta |
| 2015/0095299 A1 | 4/2015 | Dickie et al. |
| 2015/0095379 A1 | 4/2015 | Dickie et al. |
| 2015/0286681 A1 | 10/2015 | Baer |
| 2015/0286682 A1 | 10/2015 | Ziauddin |
| 2015/0363404 A1 | 12/2015 | Dickie |
| 2015/0363447 A1 | 12/2015 | Dickie |
| 2016/0004727 A1 | 1/2016 | Tsuchida |
| 2016/0162548 A1 | 6/2016 | Dickie et al. |
| 2016/0162599 A1 | 6/2016 | Dickie et al. |

OTHER PUBLICATIONS ip.com et al.; "Way of Improving Database Queries Performance by Automated Way of Creating Efficient Materialized Views (Containing Subset of the Columns)", IPCOM000227926D, May 29, 2013, pp. 1-5.

Baioco et al.; "An Effective Cost Model for Similarity Queries in Metric Spaces", ACM/SAC'07 Proceedings of the 2007 ACM Symposium on Applied Computing, Mar. 11-15, 2007, pp. 527-528.

IBM TDB (Dec. 2012). Estimating spread of data in database column based on customer's query execution using density function. IPCOM000224412D.

IBM TDB (Feb. 1988). Access Path Selection in Relational Database Systems. IPCOM000056992D.

MERGING METADATA FOR DATABASE STORAGE REGIONS BASED ON OVERLAPPING RANGE VALUES

CROSS-REFERENCE TO RELATED APPLICATIONS

This application is a continuation of U.S. patent application Ser. No. 14/041,250, entitled "Merging Metadata for Database Storage Regions Based On Overlapping Range Values" and filed Sep. 30, 2013, the disclosure of which is incorporated herein by reference in its entirety.

BACKGROUND

1. Technical Field

Present invention embodiments relate to merging metadata describing database storage regions, and more specifically, to merging metadata describing database storage regions based on overlapping range values.

2. Discussion of the Related Art

Searching for information using a query may result in a search of a large database table when an evaluation of the query indicates that the large database table should be scanned. In such a situation, it may be beneficial to eliminate rows in the large database table from consideration early in the scanning sequence before an unnecessarily large processing over-head has been incurred. Some database management systems maintain metadata about each storage region in the form of range values or range maps that define minimum and maximum ranges in a given storage region in order to filter storage regions before actually reading and searching the stored data. For example, if a storage region is known to contain records with column values between 100 and 200 (e.g., as stored in the range map metadata), then when a query with range values outside of that known range (e.g., a query with a value of 500) is evaluated, the evaluation can eliminate that storage region.

The size of a given storage region for which metadata is maintained defines a resource tradeoff between processing resources and storage resources. For example, if the storage region is relatively large (e.g., three megabytes (MBs)), then a query that would otherwise return a relatively small data subset (e.g., 128 kilobytes (KBs) or 0.125 MB) requires loading the entire 3 MB storage region into memory for scanning, thereby increasing the use of memory resources, interconnect bandwidth from storage into memory, and storage device read bandwidth. If the scan region covered by the metadata is relatively small (e.g., 128 KB), then the volume of metadata becomes larger relative to the size of the metadata describing a 3 MB data storage region, thereby increasing the use of processing resources used to analyze a large amount of metadata.

BRIEF SUMMARY

According to one embodiment of the present invention, a computer-implemented method merges metadata describing database storage regions. Metadata for each storage region comprises an interval including first and second interval values indicating a value range for values within that storage region. The first and second interval values are examined to identify overlapping storage regions and produce a sum of overlapped storage regions. The sum of overlapped storage regions is compared to a threshold and the metadata for the overlapped storage regions are merged based on the comparison. Embodiments of the present invention further include a system and computer program product for merging database storage regions in substantially the same manner described above.

BRIEF DESCRIPTION OF THE SEVERAL VIEWS OF THE DRAWINGS

Generally, like reference numerals in the various figures are utilized to designate like components.

DETAILED DESCRIPTION

Figure 1:
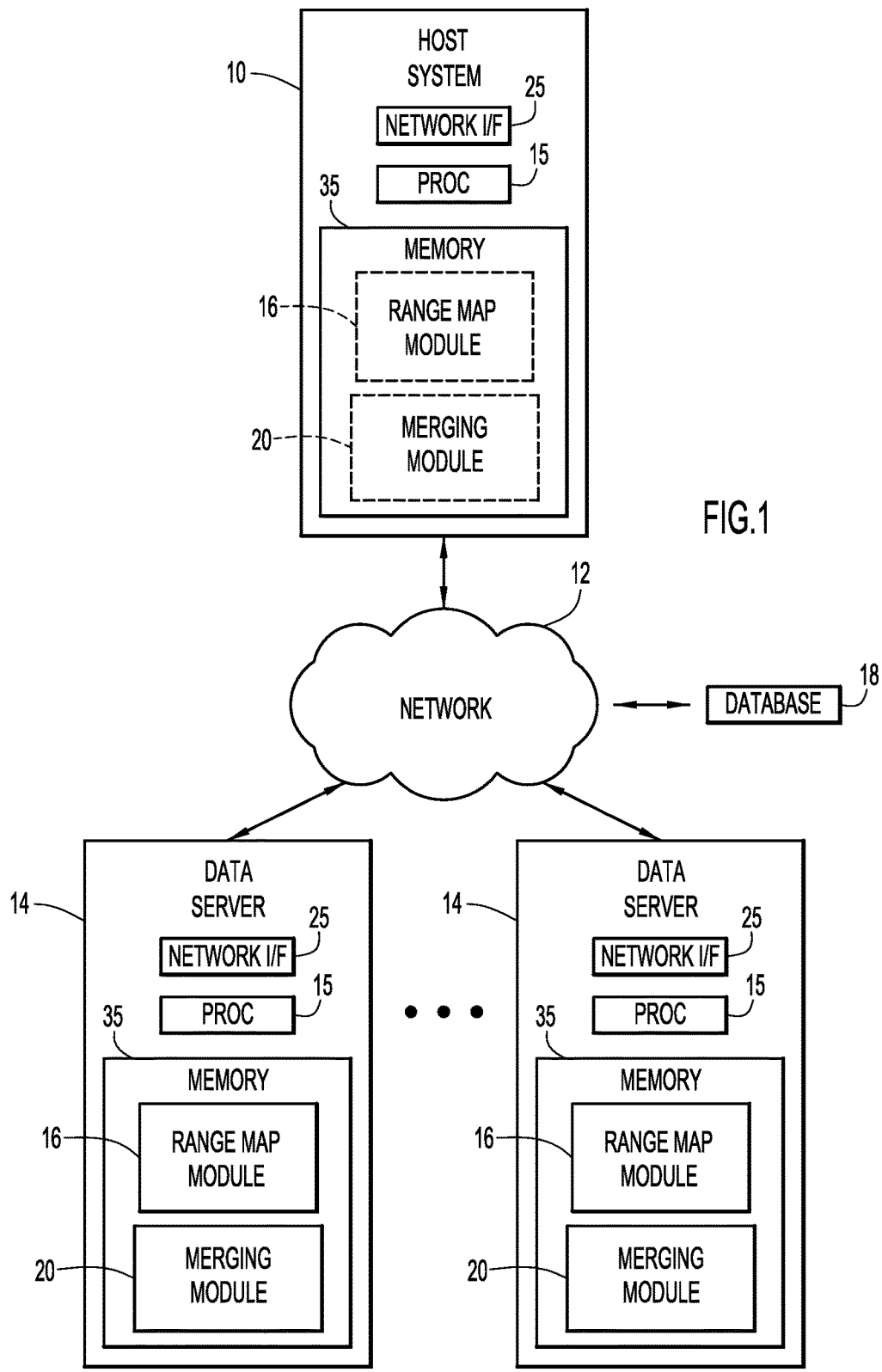
FIG. 1 is a diagrammatic illustration of an example computing environment for use with an embodiment of the present invention.

Present invention embodiments optimize a search engine (e.g., a database search engine) by merging the metadata describing storage regions with overlapping range values. Search efficiencies may be optimized by way of the techniques described herein by performing searches on smaller, more granular storage regions when those smaller regions will likely provide a target search result without searching larger storage regions. The storage region metadata are merged in the sense of combining metadata for several storage regions to be searched for data (e.g., search a single region or plural regions). The metadata for overlapping storage regions may be combined into a single set of metadata describing a larger storage region (i.e., a storage region comprising the overlapping storage regions).

For example, when traditional database query evaluation requires scanning a large table, it is beneficial to eliminate table rows from consideration very early in processing, i.e., before much effort is devoted to processing those rows. Some database management systems (DBMSs) maintain metadata about each region of table storage in order to filter table rows before actually reading the data stored in those rows. The metadata may contain value ranges or range maps that indicate minimum (min) and maximum (max) values for a given column (col) variable. Accordingly, the metadata may be of the form: col 1 {min value, max value}. For example, if a storage region is known to contain records with column values between 100 and 200 (i.e., col 1 {100, 200}), then a query restricted to records with column values greater than 500 will not read that storage region. However, if a query has a value from 100 to 200, including the values of 100 and 200, then that storage region may be read and searched. In this regard, a range map may identify upper and lower range values or bounds for data within a given storage region. The upper and lower bound may be conservative or inclusive of that bound. In one example, for a given storage region, values that are less than or equal to the upper bound (e.g., a max) in storage region's metadata, and greater than or equal to the lower bound (e.g., a min), may be found in that storage region.

In this regard, a range map may be used to define regions that do not have to be read and searched in response to a query. For example, the query may require a surname of "Smith". Thus, when a surname is part of a query, the surname "Smith", by virtue of a range map, can be used to eliminate those storage regions that do not contain "Smith" based on the "Smith" query value and the range maps.

The size of a storage region for which metadata is maintained can affect search engine performance. If the metadata covers a storage region that is relatively large (e.g., three megabytes (MB)), then even a query that returns a single row from that storage region results in reading the entire region into active memory (e.g., random access memory (RAM)), which has a cost in storage bandwidth, communications bandwidth from the storage to the memory, and use of the region of memory. If the metadata covers a storage region that is relatively small (e.g., 128 kilobytes (KB)), then the volume of metadata becomes large relative to the size of the data, thereby increasing the amount metadata that is cached in RAM and the amount of processing used to evaluate all of the metadata when deciding which regions to read into RAM. The infrastructure described above has been extended to support a hierarchy of metadata for which larger storage regions are subdivided into smaller regions.

To further illustrate, when a large table is stored on disk, it may be large enough or fragmented enough that it becomes time consuming to move the disk head to many disk regions to search the large table. The use of range maps to identify particular ranges reduces disk scan time and allows an identified range to be loaded into faster access RAM. By way of example, a page of data may be 128 KB, while 24 pages or 3 MB (i.e., 128 KB×24 pages=3 MB) may be defined as an extent. The range map hierarchy may include a range of values for both extents and pages, where a page range map describes a subset of the data described by an extent range map. Depending on the level of storage region overlap (e.g., as captured by a range map), data to be processed may be described via a list of storage ranges to be processed at the page level (i.e., one page at a time) or at the extent level (i.e., 24 pages at a time). Searches may be performed at levels between a page and an extent. For example, metadata for plural pages that are less than a complete extent (e.g., 6, 7, 15, etc., pages) may be merged according to the techniques described herein to form a single set of data that describes data as a single block (e.g., an extent). Furthermore, granularity may extend to storage regions that comprise a sub-sequence of rows in a table, whether or not that sub-sequence corresponds to a natural or inherent boundary within storage. The techniques described herein provide a way to evaluate whether or not metadata describing more granular storage regions should be merged prior to query evaluation in order to achieve granularity based search efficiencies (e.g., page versus extent searches).

An example environment for use with present invention embodiments is illustrated in FIG. 1. Specifically, the environment includes one or more server or host systems 10, and one or more data servers 14. Host systems 10 and data servers 14 may be remote from each other and communicate over a network 12. The network may be implemented by any number of any suitable communications media (e.g., wide area network (WAN), local area network (LAN), Internet, intranet, etc.). Alternatively, host systems 10 and data servers 14 may be local to each other, and communicate via any appropriate local communication medium (e.g., local area network (LAN), data center network, hardwire, wireless link, intranet, etc.). One or more clients or end user systems may be coupled to host systems 10 via a network, data center network, or data center edge switch.

Host systems 10 and data servers 14 may be implemented by any conventional or other computer systems preferably equipped with a display or monitor (not shown), a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, range map module, merging module, browser/interface software, etc.). Data servers 14 may comprise compute and storage nodes or database engine blades (e.g., in a datacenter or server farm).

Data servers 14 may receive user query information related to desired database information (e.g., data, documents, etc.) from host systems 10. In another example, the information and queries may be received by the data servers, either directly or indirectly (e.g., from a client system). The host systems 10 may include a range map module 16 to generate a hierarchical range map (e.g., database hierarchical range map), and a merging module 20 to merge metadata for the associated database storage regions. A database system 18 may store various information for merging metadata or their associated database storage regions (e.g., databases, range maps, etc.). The database system may be implemented by any conventional or other database or storage unit, may be local to or remote from host systems 10 and data servers 14, and may communicate via any appropriate communication medium (e.g., local area network (LAN), wide area network (WAN), Internet, hardwire, wireless link, intranet, etc.). Any clients, hosts, or data servers may present a graphical user interface (e.g., GUI, etc.) or other interface (e.g., command line prompts, menu screens, etc.) to solicit information from users pertaining to merging of metadata for database storage regions, and may provide results (e.g., statistics, merge statistics, etc.), such as in reports to the user, which client, host, or data server may present via the display or a printer or may send to another device/system for presenting to the user.

Alternatively, one or more hosts 10 may perform metadata merging when operating as a stand-alone unit (i.e., without using data servers 14). In a stand-alone mode of operation, the data server stores or has access to the data (e.g., range maps, databases, etc.), and includes range map module 16 to generate range maps and merging module 20 to perform metadata merging. The graphical user interface (e.g., GUI, etc.) or other interface (e.g., command line prompts, menu screens, etc.) solicits information from a corresponding user pertaining to merging of metadata, and may provide reports including merge results (e.g., metadata merge results, etc.). It should be under stood that an end user or client system may operate in a stand-alone mode and include a range map module 16 and/or a merging module 20.

Range map module 16 and merging module 20 may include one or more modules or units to perform the various functions of present invention embodiments described below. The various modules (e.g., range map module, merging module, etc.) may be implemented by any combination of any quantity of software and/or hardware modules or units, and may reside within memory 35 of the server and/or data servers for execution by processor 15. It should be understood, that the computing environment depicted in FIG. 1 provides example platforms (e.g., host systems 10, backend or data servers 14) for illustrating the techniques described herein. In this regard, data and range maps on one data server 14 may have no relationship with data and range maps on another data server 14.

Figure 2:
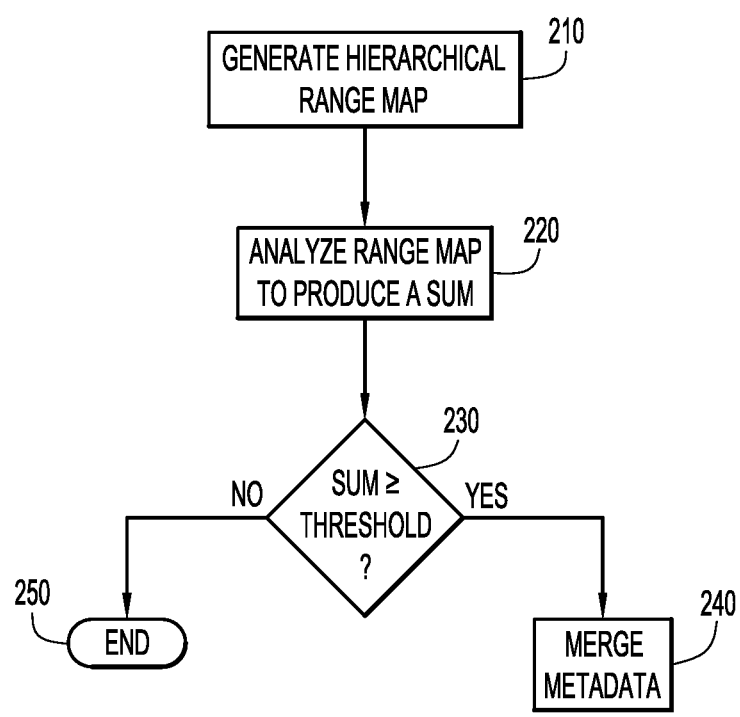
FIG. 2 is a procedural flow chart illustrating a manner in which metadata for storage regions are merged according to an embodiment of the present invention.

A manner in which range map module 16 and merging module 20 (e.g., via a host system 10 and/or data server 14) merges metadata for database storage regions according to an embodiment of the present invention is illustrated in FIG. 2. Specifically, a hierarchical range map is generated for a database at step 210. The database or database tables may be subdivided into storage regions (e.g., extents and pages of predetermined size). The size of the extents and pages may be chosen for optimization on a particular computing system (e.g., main frame, personal computer, cloud computing, etc.). Each storage region is associated with an interval including first and second interval values indicating a value range for values within that storage region (e.g., min and max values as described above). The hierarchical range map may be generated at any time and may be stored in the associated database (e.g., as a table).

The hierarchical range map is analyzed at step 220. In one example, the first and second interval values for the plurality of storage regions are sorted. The sorted first and second interval values are examined or traversed to identify overlapping storage regions and to produce a sum of overlapped storage regions. In general, when there are overlapping regions (i.e., regions with interval values that overlap), a search result may be found in more than one page, and when there is a lack of overlapping regions, then a search result may be found in a single page. Accordingly, when the ranges of values in storage regions overlap by a significant amount it becomes more efficient to search at the extent level and obtain all available query results within the extent during a single query evaluation. In contrast, when there is a lack of overlapping storage regions, as indicated by their range maps, efficiencies can be obtained by searching a single page and without consideration of other pages within the associated extent. Consider several examples that include storage range values for a table that has been divided into various storage regions.

A first simplified range map may include, for example, an extent including pages with the range values of {1, 2}, {3, 4}, and {5, 6}. These values may have been rounded from real numbers to integers. In this example range map, none of the values in the three ranges overlap one another. This indicates that it may be beneficial to keep metadata for these regions at the page level and not aggregate or merge s these ranges since any search results will likely be found only on a single page. At the next level, marginal overlap may be presented when range values partially overlap or are otherwise not mutually exclusive. Consider an extent including pages with the range values of {1, 2}, {2, 3}, and {3, 4}. In this example, there are inclusive range values at the range endpoints. However, given the limited amount of overlap, merged efficiencies will most likely not be obtained. Intuitively, a simple observation of these range values indicate that is unlikely that merge efficiencies will be attained when compared to the following examples.

In a more divergent case, consider an extent including pages with the range values of {1, 10}, {1, 2}, {3, 4}, and {5, 6}. In this example, the range of {1, 10} overlaps all remaining ranges of {1, 2}, {3, 4}, and {5, 6}, and at most, a value could be found in the range of {1, 10} and one of the other ranges {1, 2}, {3, 4}, and {5, 6}, and it is more efficient to search these pages at the page level since there in only minimal overlap of range values among ranges when considered as a whole. Numeric techniques illustrating this scenario are described in the text below.

In a different example, consider an extent including pages with the range values of: {0, 10}, {1, 11}, {2, 9}, and {3, 13}. In this example, there are some ranges that partially and completely overlap. In many DBMS, little may be known about the data within a storage region and its distribution (other than the range value metadata). For example, the data may only have one or two records within its range or almost all values may occur within a portion of the storage region while a small number of outliers define the range of values within that storage region.

In order to simplify the range map merge decision, the analysis performed at step 220 may include sorting the min and max values (note that this sorting may be performed for any of the examples presented herein) and annotating each value as a min or max value. By way of example, the above range values {0, 10}, {1, 11}, {2, 9}, and {3, 13} are sorted and may be represented as [0, 1, 2, 3, 9, 10, 11, 13]. When annotated the sorted values may be stored in table form:

| Type?  | min | min | min | min | max | max | max | max |
|--------|-----|-----|-----|-----|-----|-----|-----|-----|
| Value? | 0   | 1   | 2   | 3   | 9   | 10  | 11  | 13  |

When a minimum value in one range map equals a maximum value in another range map, by convention, the min value may be ranked lower than an equivalent max value when sorted. As the min/max data is examined or traversed, a rolling and accumulated count may be maintained that indicates a difference in quantity between traversed min values (e.g., first interval values in a range map) and traversed max values (e.g., second interval values in a range map) to obtain an overall sum that indicates a relative level of overlap among ranges associated with a storage region. The accumulated count is the integral of the rolling count (i.e., an integral value). For example, the table shown above is updated below to illustrate the rolling and accumulated (total) counts:

| col # | 1 | 2 | 3 | 4 | 5 | 6 | 7 | 8 |
|-------|---|---|---|---|---|---|---|---|
| Type? | min | min | min | min | max | max | max | max |
| Sorted values | 0 | 1 | 2 | 3 | 9 | 10 | 11 | 13 |
| Rolling count | 1 | 2 | 3 | 4 | 3 | 2 | 1 | 0 |
| Total count | 1 | 3 | 6 | 10 | 13 | 15 | 16 | 16 |

In the above table, starting at column 1, the rolling count starts at 1 and indicates the number of mins encountered relative to the number of maxes. Since the first value is always a min, the rolling count always starts at 1 and the corresponding total cumulative count is also 1. Moving next to column 2, a min is also next encountered and the rolling count is advanced to 2 (i.e., 2 minimums and no maximums encountered). The rolling count of 2 is added to the total count of 1 to produce a total count of 3. Column 3 is also a min and the rolling count is advanced to 3 (i.e., 3 minimums and no maximums encountered). The rolling count of 3 is added to the total count of 3 to produce a total count of 6. By column 5, a first max is encountered and the rolling count is reduced from 4 to 3, while the total count is advanced from 10 to 13. The process continues and the final total cumulative count is 16.

The sum of overlapped storage regions produced at step 220 is compared to a threshold at step 230. By way of example, the value of 16 produced above may be compared to a threshold that indicates a level of storage region overlap and whether or not queries should be evaluated at the page level or the extent level. In other words, the metadata may be conditionally merged based on the values of the sum and the threshold. For example, if the sum exceeds (or is greater than or equal to) the threshold, then the metadata may be merged, otherwise the metadata are not merged.

The value of 16 also represents a maximum value that may be obtained for the four ranges in the above example. Consider the above example when extended to N intervals and their associated storage regions. If there are N {min, max} intervals, then there are 2 N interval endpoints (i.e., N minimum values plus N maximum values). These endpoints are sorted as described above. The sorted list of endpoints is examined or traversed, tracking how many more mins than maxes have been encountered or observed. The current overlap value indicates a quantity of first interval values (e.g., a number of mins) that are stacked up against a quantity of second interval value (e.g., maxes) that have been encountered at a given point in the traversal. At each step in the traversal, the current overlap is accumulated into a sum. At the end of the traversal, an accumulated integral representing the degree of overlap is obtained. The maximum value for this integral is N×N (or 4×4=16, as determined in the example above). A threshold value may be applied to the above example to determine a "merge" or "no merge" condition (e.g., as determined at step 230).

The obtained sum may be normalized by dividing the sum by N×N to get a decimal or fractional value. In another embodiment, the sum may be divided by N to get a value between 0 and N for comparison to a threshold at step 230. At this point, a tuned threshold corresponding to the selected normalization denominator is applied. The 3 MB extent described above comprises 24, 128 KB, pages. When this arrangement is employed, N is 24 and may also be used as the normalizing denominator. One example threshold may be selected as 10, and the resulting normalized threshold would be 10/24 (e.g., as determined at step 230). Accordingly, when summation/normalization fraction exceeds (or equals) 10/24, the corresponding metadata for smaller storage regions may be merged into a single set of metadata describing one larger storage region and searching is performed at the extent level at step 240. In one example case of a 24 page extent, all 24 page range maps, and potentially their associated pages, may be merged when the normalized sum exceeds 10/24. In other examples, not all metadata for pages within an extent, but a subset thereof, may be merged. In this case, interval values from a subset of metadata may be analyzed as described above to determine merger of the subset of metadata. When the sum does not exceed the threshold, the process ends at step 250, and searching is performed at the page level since the metadata for the storage regions are separate.

The above thresholding algorithm may be implemented in software code or hardware logic. The algorithm runs in an N×log (N) processing time (e.g., as used for sorting the minimum and maximum range values). When the intervals are non-overlapping, then the integral (total count) has value of N, and the rolling count has a value of 1, resulting in the fraction is 1/N, which does not trigger a storage region metadata merge and searching is performed at the page level. When the intervals overlap only at their boundaries, then the sum (integral) has value 3 N−2 which is less than the 10 N equivalent for a normalized 10/24 test ratio and searching is performed at the page level. When an interval is added that overlaps all of the other intervals the integral increases to 5 N−6 which is less that the 10 N equivalent for a normalized 10/24 test ratio and searching is performed at the page level. If all of the intervals overlap then the integral has value of N*N which exceeds the 10/24 merge threshold and searching is performed at the extent level. When there is an intermediate value data point where several intervals are overlapping all of the others, or where general value randomization produces a relatively large quantity of overlaps, the algorithm generally triggers a metadata merge event and searching is performed at the extent level.

The above procedure, or parts thereof, may also be reiterated when new and/or newly updated data are added to the system. In modern environments that include cloud computing and virtualized infrastructures, maintaining a rigid, fixed size, hierarchical range map may limit search efficiencies. In other words, it may be beneficial to define extents and pages in various sizes and combinations for various reasons including host processing environment and resources (e.g., available processing versus available memory/storage resources). For example, if processing resources are abundant, then granularity may be increased, and reduced when those resources are less abundant. Furthermore, it may be beneficial to keep a series of range maps with varying degrees of granularity that may be selected based on a current resource workload. By way of example, a datacenter environment has varying workloads based on the time of day. For example, the datacenter workload may follow the wake and sleep cycles of users around the world. Thus, in datacenter virtualized environments, among other environments, the techniques described herein may be facilitated by virtual machines (VMs) (e.g., running on a hypervisor).

The techniques described herein may be used to modify, adapt, or adjust both the hierarchical data sizes (e.g., extent and page sizes) as well as the threshold value (i.e., further tuning the threshold value up or down based on the computing environment or the computing environment processing and memory resources). Accordingly, the techniques described herein provide a mechanism for optimizing a range map hierarchy by reducing certain granularities within a given hierarchical range map. That is, keeping metadata for finer-grained regions when it is deemed useful, and merging this metadata into metadata for larger regions when the finer-grained metadata is deemed insufficiently useful.

It will be appreciated that the embodiments described above and illustrated in the drawings represent only a few of the many ways of implementing merging metadata for database storage regions based on overlapping range values.

The environment of the present invention embodiments may include any number of computer or other processing systems (e.g., client or end-user systems, host systems, data servers, etc.) and databases or other repositories arranged in any desired fashion, where the present invention embodiments may be applied to any desired type of computing environment (e.g., cloud computing, client-server, network computing, mainframe, stand-alone systems, etc.) for which the search engine will operate or execute (e.g., the native or target computing environment). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, range map module, merging module, etc.). These systems may include any types of monitors and input devices (e.g., keyboard, mouse, voice recognition, etc.) to enter and/or view information.

It is to be understood that the software (e.g., range map module, merging module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among the various end-user/client, data servers, and host systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., range map module, merging module, etc.) may be available on a recordable or computer useable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, intranet, etc.).

The system may employ any number of any conventional or other databases, data stores or storage structures (e.g., files, databases, data structures, data or other repositories, etc.) to store information (e.g., data, documents, range maps, etc.). The database system may be implemented by any number of any conventional or other databases, data stores or storage structures (e.g., files, databases, data structures or tables, data or other repositories, etc.) to store information (e.g., data, documents, range maps, etc.). The database system may be included within or coupled to the server and/or data servers. The database systems and/or storage structures may be remote from or local to the computer or other processing systems, and may store any desired data (e.g., data, documents, range maps, etc.). Further, the various tables (e.g., data, indexes, range maps, etc.) may be implemented by any conventional or other data structures (e.g., files, arrays, lists, stacks, queues, etc.) to store information, and may be stored in any desired storage unit (e.g., database, data or other repositories, etc.).

Present invention embodiments may be utilized for determining merger of any quantity of metadata for storage regions for any type of database (e.g., relational, object oriented, NoSQL, etc.), memory or any other storage structure.

The range maps may be developed in any manner (e.g., manually developed, based on a template, rule based, etc.) and contain any type of data (names, integers, real numbers, etc.). The range maps may be designed in any manner that facilitates database searching. The range maps may be in any format (e.g., plain text, database tables, nested XML code, etc.). Any number of range maps may be used for document searching.

The range map hierarchy may be based on any number of levels of granularity (e.g., extents, pages, sets of rows, etc.) and may employ any desired data sizes for the hierarchy (e.g., 8 MB, 3 MB, 128 KB, 64 KB, etc.) to obtain any desired level of data hierarchy. Merging of metadata for storage regions may be performed with any desired level of granularity. For example, all of the metadata at the page level may be merged to form a complete set of metadata for an extent, or a subset of metadata for pages may be merged that do not form metadata for a complete extent (e.g., metadata for six out of 24 pages of an extent may be merged). New range maps may be generated to reflect ranges within the merged metadata. The new range maps may be generated from existing range maps or generated anew. When a query is evaluated, the new range maps may be used to eliminate or include storage regions during a search.

The present invention embodiments may employ any number of any type of user interface (e.g., Graphical User Interface (GUI), command-line, prompt, etc.) for obtaining or providing information (e.g., databases, documents, indexes, range maps, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for analyzing range maps associated with any type of database, memory or any other storage structure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (Java and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of processing a query based on merging of metadata for a plurality of storage regions within memory, wherein the metadata for each storage region comprises an interval including first and second interval values indicating a value range for values within that storage region, the computer-implemented method comprising:

examining the first and second interval values to identify storage regions with values having overlapping value ranges indicated by the first and second interval values and producing a sum of overlapped storage regions indicating an amount of overlap between the storage regions;

comparing the sum of overlapped storage regions to a threshold to determine greater processing efficiencies between processing of individual storage regions and processing storage regions as a group;

merging the metadata of the overlapped storage regions based on the comparison indicating searching the group of storage regions achieves greater processing efficiencies, wherein the merged metadata is associated with the group of storage regions to be searched; and processing a query by searching storage regions identified based on a query value and the merged metadata.

2. The computer-implemented method of claim 1, wherein the examining the first and second interval values comprises:

determining for each examined interval value a difference in quantity between examined first interval values and examined second interval values; and accumulating the differences in quantity for the examined interval values to produce the sum of overlapped storage regions.

3. The computer-implemented method of claim 2, wherein comparing the sum of overlapped storage regions comprises:

normalizing the sum of overlapped storage regions based on a maximum quantity of overlaps and comparing the normalized sum to the threshold.

4. The computer-implemented method of claim 1, further comprising:

generating first and second interval values to indicate value ranges for values within the merged metadata.

5. The computer-implemented method of claim 4, further comprising:

evaluating a query comprising information indicating the query value; and determining the storage regions to be searched for the processing of the query based on the query value and the generated first and second interval values.

6. The computer-implemented method of claim 4, further comprising:

updating the sum of overlapped storage regions based on changes in the data stored within the plurality of storage regions and their associated metadata; and comparing the updated sum of overlapped storage regions to a threshold and merging the metadata based on the comparison to produce updated metadata.

7. The computer-implemented method of claim 1, further comprising adjusting the threshold based on a target computing environment used for processing queries.

8. A system for processing a query based on merging of metadata for a plurality of storage regions within memory, wherein the metadata for each storage region comprises an interval including first and second interval values indicating a value range for values within that storage region, the system comprising:

a computer system including at least one processor configured to:

examine the first and second interval values to identify storage regions with values having overlapping value ranges indicated by the first and second interval values and to produce a sum of overlapped storage regions indicating an amount of overlap between the storage regions;

compare the sum of overlapped storage regions to a threshold to determine greater processing efficiencies between processing of individual storage regions and processing storage regions as a group;

merge the metadata of the overlapped storage regions based on the comparison indicating searching the group of storage regions achieves greater processing efficiencies, wherein the merged metadata is associated with the group of storage regions to be searched; and process a query by searching storage regions identified based on a query value and the merged metadata.

9. The system of claim 8, wherein examining the first and second interval values includes:

determining for each examined interval value a difference in quantity between examined first interval values and examined second interval values; and accumulating the differences in quantity for the examined interval values to produce the sum of overlapped storage regions.

10. The system of claim 9, wherein comparing the sum of overlapped storage regions includes:

normalizing the sum of overlapped storage regions based on a maximum quantity of overlaps and comparing the normalized sum to the threshold.

11. The system of claim 8, wherein the at least one processor is further configured to generate first and second interval values to indicate value ranges for values within the merged metadata.

12. The system of claim 11, wherein the at least one processor is further configured to:

evaluate a query comprising information indicating the query value; and determine the storage regions to be searched for the processing of the query based on the query value and the generated first and second interval values.

13. The system of claim 11, wherein the at least one processor is further configured to:

update the sum of overlapped storage regions based on changes in the data stored within the plurality of storage regions and their associated metadata; and compare the updated sum of overlapped storage regions to a threshold and merge the metadata based on the comparison to produce updated metadata.

14. A computer program product for processing a query based on merging of metadata for a plurality of storage regions within memory, wherein the metadata for each storage region comprises an interval including first and second interval values indicating a value range for values within that storage region, the computer program product comprising:

a computer readable storage medium having computer readable program code embodied therewith, the computer readable program code comprising computer readable program code configured to:

examine the first and second interval values to identify storage regions with values having overlapping value ranges indicated by the first and second interval values and to produce a sum of overlapped storage regions indicating an amount of overlap between the storage regions;

compare the sum of overlapped storage regions to a threshold to determine greater processing efficiencies between processing of individual storage regions and processing storage regions as a group;

merge the metadata of the overlapped storage regions based on the comparison indicating searching the group of storage regions achieves greater processing efficiencies, wherein the merged metadata is associated with the group of storage regions to be searched; and process a query by searching storage regions identified based on a query value and the merged metadata.

15. The computer program product of claim 14, wherein examining the first and second interval values includes:
   determining for each examined interval value a difference in quantity between examined first interval values and examined second interval values; and
   accumulating the differences in quantity for the examined interval values to produce the sum of overlapped storage regions.

16. The computer program product of claim 15, wherein comparing the sum of overlapped storage regions includes:
   normalizing the sum of overlapped storage regions based on a maximum quantity of overlaps and comparing the normalized sum to the threshold.

17. The computer program product of claim 14, wherein the computer readable program code further comprises computer readable program code configured to generate first and second interval values to indicate value ranges for values within the merged metadata.

18. The computer program product of claim 17, wherein the computer readable program code further comprises computer readable program code configured to:
   evaluate a query comprising information indicating the query value; and
   determine the storage regions to be searched for the processing of the query based on the query value and the generated first and second interval values.

19. The computer program product of claim 17, wherein the computer readable program code further comprises computer readable program code configured to:
   update the sum of overlapped storage regions based on changes in the data stored within the plurality of storage regions and their associated metadata; and
   compare the updated sum of overlapped storage regions to a threshold and merge the metadata based on the comparison to produce updated metadata.

20. The computer program product of claim 14, wherein the computer readable program code further comprises computer readable program code configured to adjust the threshold based on a target computing environment used for processing queries.

* * * * *